(12) United States Patent  (10) Patent No.: US 8,818,468 B2
Matsuo  (45) Date of Patent: Aug. 26, 2014

(54) MOBILE TERMINAL WITH RELATIVE SLIDE HOUSING POSITIONS DETERMINING OPERATIONAL MODES

(75) Inventor: Naoki Matsuo, Osaka (JP)

(73) Assignee: KYOCERA Corporation, Kyoto (JP)

( * ) Notice: Subject to any disclaimer, the term of this patent is extended or adjusted under 35 U.S.C. 154(b) by 312 days.

(21) Appl. No.: 12/810,475

(22) PCT Filed: Dec. 25, 2008

(86) PCT No.: PCT/JP2008/073583
§ 371 (c)(1),
(2), (4) Date: Jun. 24, 2010

(87) PCT Pub. No.: WO2009/084579
PCT Pub. Date: Jul. 9, 2009

(65) Prior Publication Data
US 2010/0279657 A1    Nov. 4, 2010

(30) Foreign Application Priority Data
Dec. 27, 2007  (JP) ................................ 2007-337607

(51) Int. Cl.
*H04M 1/677* (2006.01)
*G06F 3/0488* (2013.01)
*G06F 1/32* (2006.01)
*G06F 1/16* (2006.01)
*H04M 1/02* (2006.01)

(52) U.S. Cl.
CPC ......... *H04M 1/0245* (2013.01); *G06F 3/04883* (2013.01); *G06F 1/3262* (2013.01); *H04M 2250/22* (2013.01); *H04M 1/0235* (2013.01); *Y02B 60/1253* (2013.01); *Y02B 60/1278* (2013.01); *G06F 1/1624* (2013.01); *Y02B 60/1282* (2013.01); *G06F 1/3259* (2013.01); *H04M 1/677* (2013.01); *G06F 1/3287* (2013.01)
USPC ...................................... 455/575.4; 455/566

(58) Field of Classification Search
USPC ......................................................... 455/566
See application file for complete search history.

(56) References Cited

U.S. PATENT DOCUMENTS 7,548,203 B2 * 6/2009 Kalliola et al. ............... 342/418
7,672,700 B2 * 3/2010 Oda ........................... 455/575.4
(Continued)

FOREIGN PATENT DOCUMENTS

JP 2002-268776 9/2002
JP 2003-018241 A 1/2003
(Continued)

OTHER PUBLICATIONS

Notice of Ground of Rejection dated May 31, 2011 issued for counterpart Japanese Application No. 337607/2007.

(Continued)

*Primary Examiner* — Lester Kincaid
*Assistant Examiner* — Diego Herrera
(74) *Attorney, Agent, or Firm* — Procopio, Cory, Hargreaves & Savitch LLP

(57) ABSTRACT

In order to facilitate an operation of locking or unlocking a touch panel, a mobile terminal includes a first housing, a second housing connected to the first housing in a slidable manner, a touch panel provided on the first housing, a style detecting portion (S01, S08, S09) for detecting one of a plurality of possible styles on the basis of the relative positions of the first and second housings, a signal accepting portion (S04) for accepting a signal output from the touch panel, and a mode switching portion (S05, S06) for switching an input mode between a lock mode and an unlock mode on the basis of the detected style and presence/absence of a signal output from the touch panel.

10 Claims, 6 Drawing Sheets

(56) References Cited

U.S. PATENT DOCUMENTS

| | | | |
|---|---|---|---|
| 7,953,464 B2* | 5/2011 | Park et al. | 455/575.4 |
| 8,014,835 B2* | 9/2011 | Mizuta et al. | 455/575.1 |
| 8,078,232 B2* | 12/2011 | Higashiyama et al. | 455/566 |
| 8,098,231 B2* | 1/2012 | Jacobs et al. | 345/168 |
| 8,122,491 B2* | 2/2012 | Yee et al. | 726/9 |
| 8,155,718 B2* | 4/2012 | Byun et al. | 455/575.4 |
| 8,412,281 B2* | 4/2013 | Higashiyama et al. | 455/566 |
| 2003/0064688 A1 | 4/2003 | Mizuta et al. | |
| 2003/0181228 A1* | 9/2003 | Kim | 455/575.3 |
| 2004/0198437 A1* | 10/2004 | Yamamoto et al. | 455/556.1 |
| 2004/0235540 A1* | 11/2004 | Yajima | 455/575.3 |
| 2005/0068304 A1* | 3/2005 | Lewis et al. | 345/168 |
| 2005/0104856 A1* | 5/2005 | Jacobs et al. | 345/169 |
| 2007/0049358 A1* | 3/2007 | Kang et al. | 455/575.1 |
| 2007/0126705 A1* | 6/2007 | Ko et al. | 345/170 |
| 2007/0287512 A1* | 12/2007 | Kilpi et al. | 455/575.1 |
| 2008/0001703 A1* | 1/2008 | Goto | 340/5.8 |
| 2008/0051041 A1* | 2/2008 | Griffin et al. | 455/90.3 |
| 2008/0070648 A1* | 3/2008 | Kang et al. | 455/575.3 |
| 2008/0119217 A1* | 5/2008 | Coxhill | 455/550.1 |
| 2008/0129554 A1* | 6/2008 | Patel | 341/24 |
| 2008/0287169 A1* | 11/2008 | Kim et al. | 455/575.4 |
| 2009/0286575 A1* | 11/2009 | Taniguchi et al. | 455/566 |
| 2010/0216447 A1* | 8/2010 | Park et al. | 455/418 |

FOREIGN PATENT DOCUMENTS

| | | |
|---|---|---|
| JP | 2003-179678 | 6/2003 |
| JP | 2005-136778 A | 5/2005 |
| JP | 2006-067532 | 3/2006 |
| JP | 2007-074716 A | 3/2007 |
| KR | 2003-0046891 A | 6/2003 |
| KR | 10-2007-0097271 A | 10/2007 |

OTHER PUBLICATIONS

Notice of Argument Submission dated Nov. 28, 2011, in counterpart Korean Application No. 2010-7016344.

Notice of Decision to Grant Patent dated Apr. 5, 2012, issued in counterpart Korean Application No. 2010-7016344.

Notice of Ground of Rejection dated Feb. 26, 2013, issued in counterpart Japanese Application No. 2011-168467.

* cited by examiner

F I G. 3
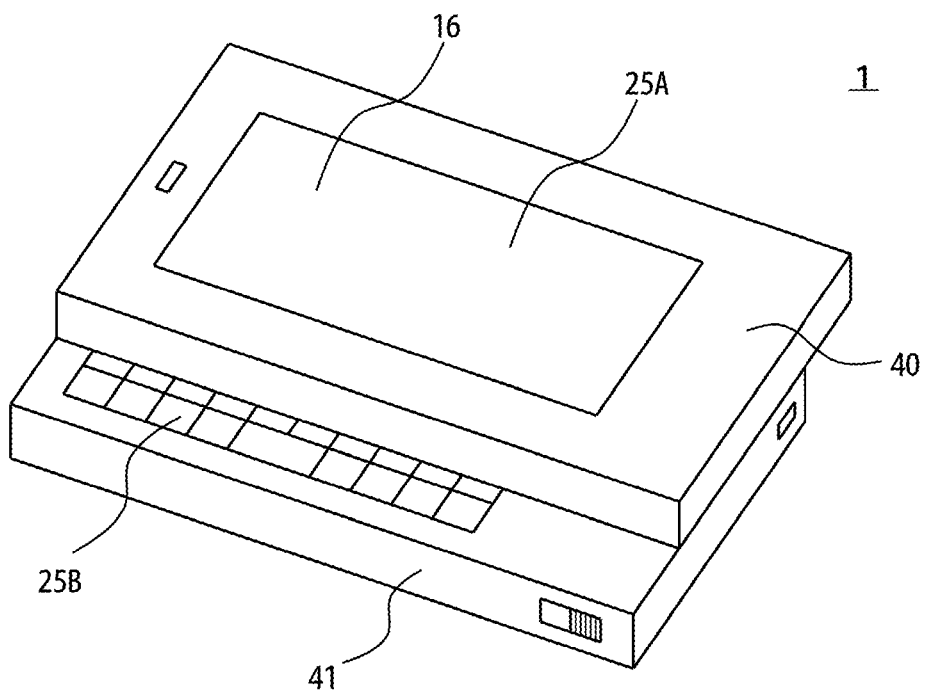

MOBILE TERMINAL WITH RELATIVE SLIDE HOUSING POSITIONS DETERMINING OPERATIONAL MODES

TECHNICAL FIELD

The present invention relates to a mobile terminal, and more particularly to a mobile terminal provided with a touch panel.

BACKGROUND ART

There has recently appeared a mobile phone provided with a touch panel serving as a user interface. This mobile phone may suffer a malfunction, while being carried for example, when the touch panel comes into contact with an external object. Thus, a technique is known which locks the touch panel by a switch that is provided independently from the touch panel (see, for example, Patent Document 1).

This technique however requires a user to turn on the switch in order to use the touch panel, leading to complicated operations.

[Patent Document 1] Japanese Patent Application Laid-Open No. 2002-268776

DISCLOSURE OF THE INVENTION

Problems to be Solved by the Invention

The present invention has been accomplished to solve the above-described problem, and an object of the present invention is to provide a mobile terminal in which an operation of unlocking the touch panel is facilitated.

Another object of the present invention is to provide a mobile terminal in which an operation of locking the touch panel is facilitated.

Means for Solving the Problems

To achieve the above-described objects, according to an aspect of the present invention, a mobile terminal includes: a first housing; a second housing connected to the first housing in a slidable manner; a touch panel provided on the first housing or the second housing; style detecting portion to detect one of a plurality of possible styles on the basis of relative positions of the first and second housings; signal accepting portion to accept a signal output from the touch panel; and mode switching portion, in the state where an input mode is a lock mode in which a signal output from the touch panel is disabled, to switch the input mode to an unlock mode in which a signal output from the touch panel is enabled, in response to an event that a signal is accepted by the signal accepting portion at a time that is determined in accordance with the style detected by the style detecting portion.

According to another aspect of the present invention, a mobile terminal includes: a first housing; a second housing connected to the first housing in a slidable manner; a touch panel provided on the first housing or the second housing; style detecting portion to detect one of a plurality of possible styles on the basis of relative positions of the first and second housings; signal accepting portion to accept a signal output from the touch panel; and mode switching means, in the state where an input mode is an unlock mode in which a signal output from the touch panel is enabled, for switching the input mode to a lock mode in which a signal output from the touch panel is disabled, in the case where no signal is being accepted by the signal accepting portion at a time that is determined in accordance with the style detected by the style detecting portion.

BRIEF DESCRIPTION OF THE DRAWINGS

FIG. 3 is a perspective view of the mobile terminal in an intermediate style.

BEST MODES FOR CARRYING OUT THE INVENTION

Figure 1:
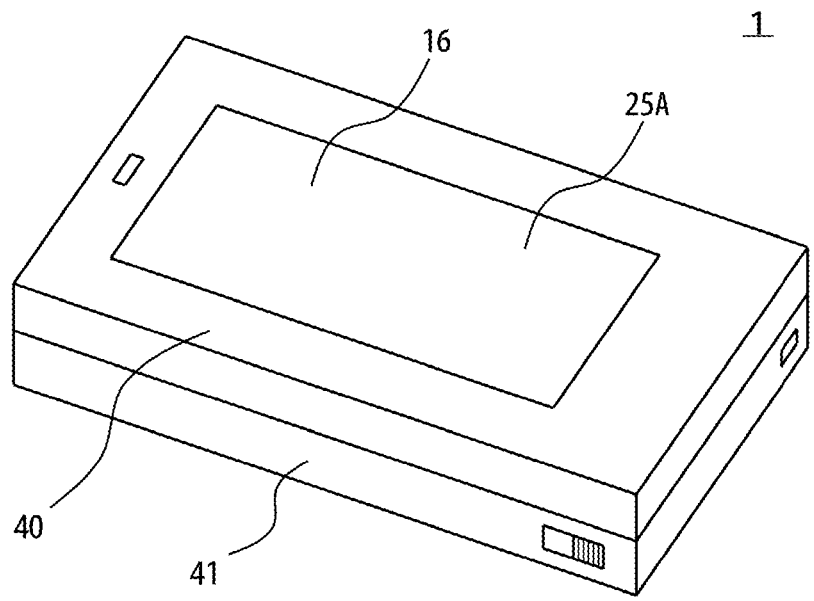
FIG. 1 is a perspective view of a mobile terminal in a primary style.

Embodiments of the present invention will now be described with reference to the drawings. In the following description, like reference characters denote like parts, which have like names and functions, and therefore, detailed description thereof will not be repeated.

Figure 2:
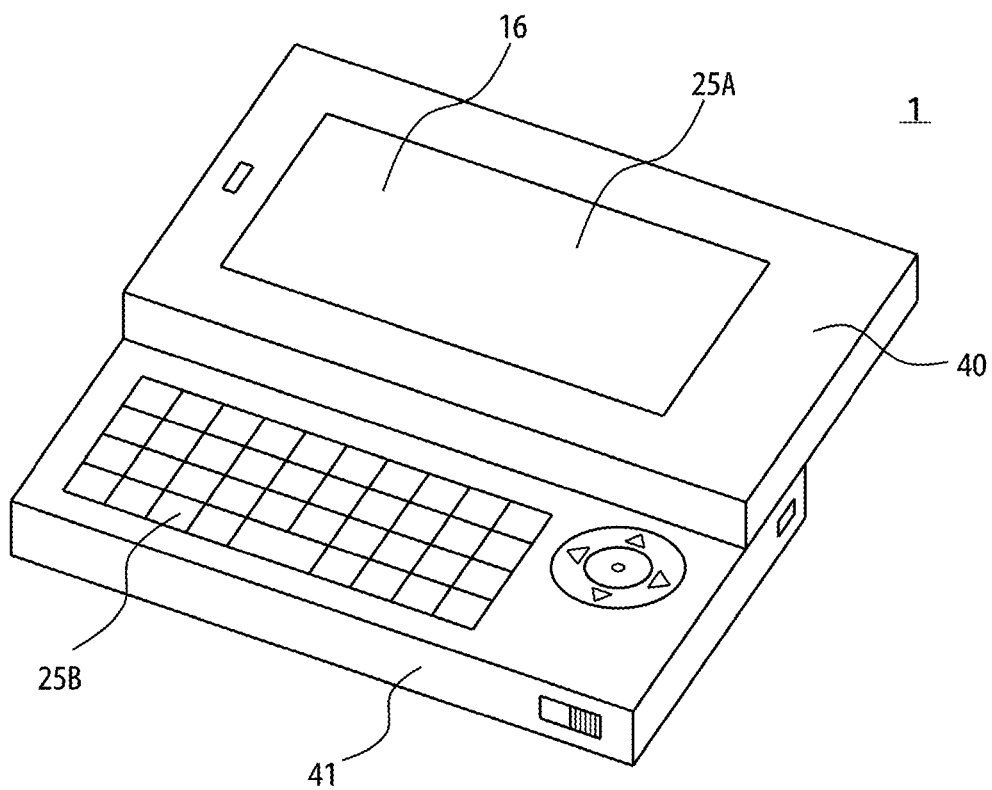
FIG. 2 is a perspective view of the mobile terminal in an open style.

FIG. 1 is a perspective view of a mobile terminal in a primary style. FIG. 2 is a perspective view of the mobile terminal in an open style. FIG. 3 is a perspective view of the mobile terminal in an intermediate style. Referring to FIGS. 1 to 3, a mobile terminal 1 includes a first housing 40 and a second housing 41. First housing 40 and second housing 41 are connected in a slidable manner, so that they can move relative to each other. In the primary style shown in FIG. 1, mobile terminal 1 has an approximately rectangular parallelepiped shape, with first housing 40 overlying second housing 41. First housing 40 includes, on its surface opposite from its other surface facing second housing 41, a liquid crystal display (LCD) 16 and a touch panel 25A overlaid on LCD 16. Second housing 41 includes, on its surface facing first housing 40, operation keys 25B constituting a full keyboard.

Referring to FIG. 1, in mobile terminal 1 in the primary style (i.e. a first style), the surface of second housing 41 facing first housing 40 is covered by first housing 40, whereby operation keys 25B are hidden. Thus, the user cannot operate operation keys 25B while mobile terminal 1 is in the primary style. On the other hand, touch panel 25A provided on the surface of first housing 40 is exposed to the outside. Thus, the user can touch the touch panel 25A from the outside.

Referring to FIG. 2, in mobile terminal 1 in the open style (i.e. a second style), the surface of second housing 41 facing first housing 40 is partly exposed to the outside. This allows the user to operate operation keys 25B that are exposed to the outside. On the other hand, touch panel 25A is exposed to the outside in the open style, as in the case of the primary style, allowing the user to touch the touch panel 25A from the outside.

Referring to FIG. 3, the intermediate style (i.e. a third style) corresponds to the style that is neither the primary style nor the open style. When first housing 40 and second housing 41 slide with respect to each other from the state where mobile terminal 1 is in the primary style or the open style, mobile terminal 1 attains the intermediate style. When first housing 40 and second housing 41 slide with respect to each other from the state where mobile terminal 1 is in the intermediate style, mobile terminal 1 attains the primary style or the open style. While the intermediate style includes a plurality of styles, one of them is shown in FIG. 3 by way of example.

Figure 4:
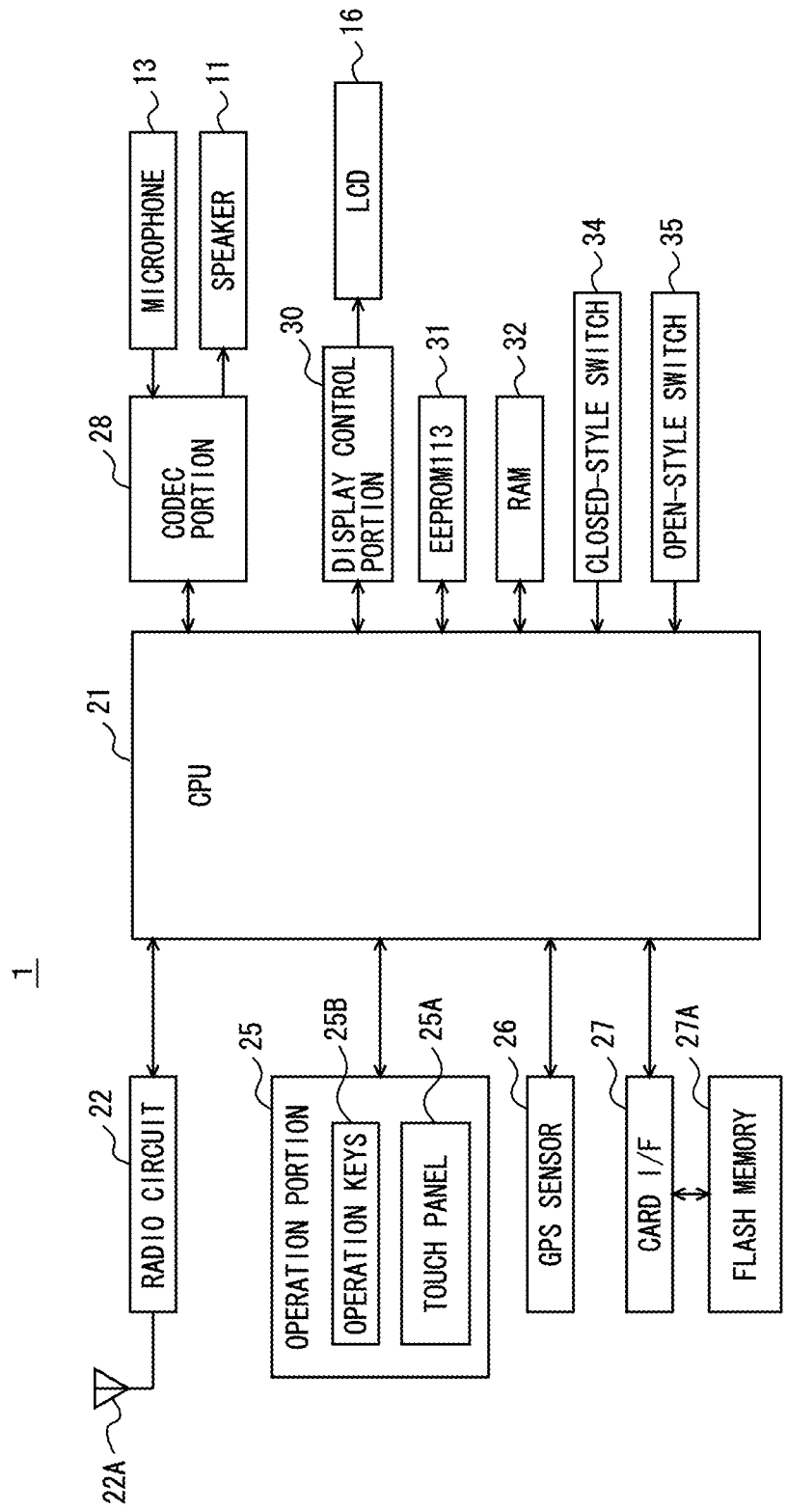
FIG. 4 is a functional block diagram schematically showing the hardware configuration of a mobile terminal according to an embodiment.

FIG. 4 is a functional block diagram schematically showing the hardware configuration of the mobile terminal according to the present embodiment. Referring to FIG. 4, mobile terminal 1 includes: a CPU 21 which is responsible for overall control of mobile terminal 1; a radio circuit 22 which is connected to an antenna 22A; an operation portion 25 which accepts an input of a user operation; a GPS sensor 26; a card interface (I/F) 27; a codec portion 28 for processing audio data; a speaker 11 and a microphone 13 which are connected to codec portion 28; a display control portion 30 for controlling display on LCD 16; an electronically erasable and programmable read only memory (EEPROM) 31 for storing a program to be executed by CPU 21 and others; a random access memory (RAM) 32 used as a work area for CPU 21; a closed-style switch 34; and an open-style switch 35.

Radio circuit 22 is supplied with a radio signal which has been received by antenna 22A. Radio circuit 22 demodulates the radio signal, and outputs it to CPU 21. In the case where the demodulated radio signal is an audio signal, CPU 21 outputs the audio signal to codec portion 28. When radio circuit 22 receives a signal from CPU 21, it modulates the signal, and outputs the modulated radio signal to antenna 22A. CPU 21, on receipt of an audio signal from codec portion 28, outputs the audio signal to radio circuit 22.

Codec portion 28 decodes an audio signal input from CPU 21, converts the decoded digital audio signal to an analog signal, amplifies the same, and outputs the resultant signal to speaker 11 which serves as a receiver. When receiving an analog audio signal from microphone 13, codec portion 28 converts the audio signal into a digital signal, codes the same, and outputs the coded audio signal to CPU 21.

Display control portion 30 is controlled by CPU 21. Display control portion 30 controls LCD 16 in accordance with an instruction input from CPU 21, to cause LCD 16 to display an image. The image displayed on LCD 16 includes moving and still images.

Operation portion 25 includes touch panel 25A and operation keys 25B. When a user touches a touch panel surface with the finger or the like, touch panel 25A detects the position touched by the finger or the like. The touch panel outputs the detected position to CPU 21. When buttons and the like are displayed on LCD 16, touch panel 25A may detect depression of any of the positions corresponding to the respective buttons, to allow CPU 21 to accept various operations.

Operation keys 25B include a plurality of keys assigned with alphanumeric, kana, katakana, and other symbols. When a user depresses the keys, operation keys 25B outputs to CPU 21 codes of the alphanumeric, kana, katakana, and other symbols assigned to the depressed keys. Operation portion 25 also includes multifunction keys for moving the cursor and selection. When a multifunction key is depressed, operation keys 25B outputs to CPU 21 a command assigned to that depressed key.

CPU 21, on receipt of an operation from operation keys 25B, performs processing in accordance with the input operation. CPU 21 reads and executes a plurality of application programs stored in EEPROM 31. While these application programs are written in a program language such as C or JAVA (registered trademark), the program languages used for writing the application programs are not restricted thereto; any other program languages may be used. Further, while the plurality of application programs are stored in EEPROM 31 and loaded into mobile terminal 1, the plurality of application programs may be written in a single program language, or in different program languages. That is, there may be a plurality of application programs written in different program languages.

Closed-style switch 34 is ON when mobile terminal 1 is in the primary style, and OFF when it is not in the primary style. Open-style switch 35 is ON when mobile terminal 1 is in the open style, and OFF when it is not in the open style. Open-style switch 35 and closed-style switch 34 are connected to CPU 21, and CPU 21 detects the style of mobile terminal 1 by detecting the states of closed-style switch 34 and open-style switch 35.

GPS sensor 26 receives radio waves from a GPS satellite in the global positioning system (GPS), to measure the current position on a map. GPS sensor 26 outputs positional information indicating the obtained position on the map to CPU 21.

Card I/F 27 is mounted with a removable flash memory 27A. CPU 21 is capable of accessing flash memory 27A via card I/F 27. While it is here assumed that the program to be executed by CPU 21 is stored in EEPROM 31, the program may be stored in flash memory 27A and read from flash memory 27A for execution by CPU 21. The recording medium for storing the program is not restricted to flash memory 27A. It may be a flexible disk, a cassette tape, an optical disk (compact disc-ROM (CD-ROM), magnetic optical disc (MO), mini disc (MD), digital versatile disc (DVD)), an IC card (including a memory card), an optical card, or a semiconductor memory such as a mask ROM, an EPROM, or the like. Still alternatively, mobile terminal 1 may be connected to the Internet via radio circuit 22 and the program may be downloaded from a computer connected to the Internet, to be executed by CPU 21. As used herein, the "program" includes, not only the program directly executable by CPU 21, but also a program in the form of a source program, a compressed program, an encrypted program, and others.

Figure 5:
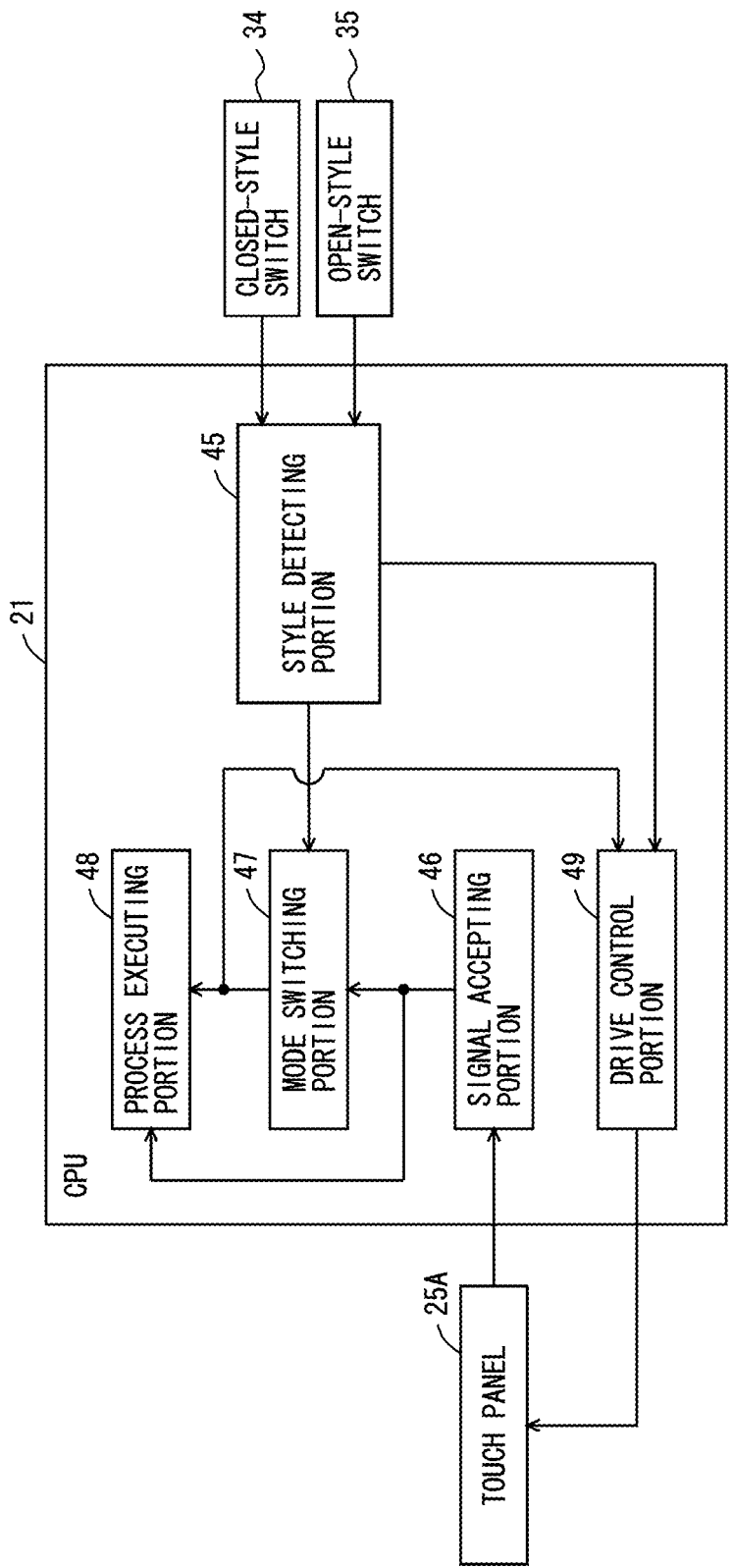
FIG. 5 is a functional block diagram schematically showing the functions of a CPU included in the mobile terminal.

FIG. 5 is a functional block diagram schematically showing the functions of the CPU included in the mobile terminal. Referring to FIG. 5, CPU 21 includes: a style detecting portion 45 which detects the style of mobile terminal 1; a signal accepting portion 46 which accepts a signal output from touch panel 25A; a mode switching portion 47 which switches the operation mode of mobile terminal 1; a process executing portion 48 which performs processing; and a drive control portion 49 which controls driving of touch panel 25A.

Style detecting portion 45 detects the states of closed-style switch 34 and open-style switch 35 so as to detect the style of mobile terminal 1. Specifically, it detects that mobile terminal 1 is in the primary style when closed-style switch 34 is ON, that mobile terminal 1 is in the open style when open-style switch 35 is ON, and that mobile terminal 1 is in the intermediate style when closed-style switch 34 and open-style switch 35 are both OFF. Style detecting portion 45 outputs the detected style to mode switching portion 47 and drive control portion 49.

Signal accepting portion 46 accepts a signal indicating a position, which is output from touch panel 25A. Signal accepting portion 46 outputs the accepted signal to mode switching portion 47 and process executing portion 48.

Mode switching portion 47 switches the input mode on the basis of the style detected by style detecting portion 45 and presence/absence of a signal accepted by signal accepting portion 46. The input modes include: a lock mode for disabling the signal accepted from the touch panel; and an unlock mode for enabling the signal accepted from the touch panel. Mode switching portion 47 switches the input mode between the lock mode and the unlock mode. Mode switching portion 47 outputs the input mode to process executing portion 48 and drive control portion 49.

Process executing portion 48 executes an application program. Process executing portion 48 accepts a signal input from signal accepting portion 46, in accordance with the input mode that is input from mode switching portion 48. Specifically, process executing portion 48 accepts the signal input from signal accepting portion 46 if the input mode is the unlock mode, while it does not accept the signal input from signal accepting portion 46 if the input mode is the lock mode. In the case of accepting the signal input from signal accepting portion 46, process executing portion 48 executes a process that is determined by the application program, in accordance with the accepted signal.

Drive control portion 49 controls driving of touch panel 25A. Specifically, it switches whether to supply electric power to touch panel 25A. In the state where drive control portion 49 controls such that electric power is not supplied to touch panel 25A, when mobile terminal 1 is changed in style from the primary or open style to the intermediate style, drive control portion 49 switches the state such that electric power is supplied to touch panel 25A. Accordingly, even in the case where the input mode is the lock mode, when mobile terminal 1 is changed in style from the primary or open style to the intermediate style, electric power is supplied to touch panel 25A, so that signal accepting portion 46 can accept a signal from touch panel 25A.

Furthermore, in the state where drive control portion 49 controls such that electric power is supplied to touch panel 25A, when the input mode is switched from the unlock mode to the lock mode, drive control portion 49 switches the state such that electric power is not supplied to touch panel 25A. Electric power supply to touch panel 25A is stopped when the input mode is the lock mode, which can reduce consumed power.

While touch panel 25A of a capacitive type is used in the present embodiment, a touch panel of an analog resistive film type, ultrasonic surface acoustic wave type, infrared ray cutting off type, electromagnetic induction type, or image recognition type may be used as well. In the case of using touch panel 25A of a resistive film type, which consumes only a small amount of electric power, it is unnecessary for drive control portion 49 to control electric power supply.

Figure 6:
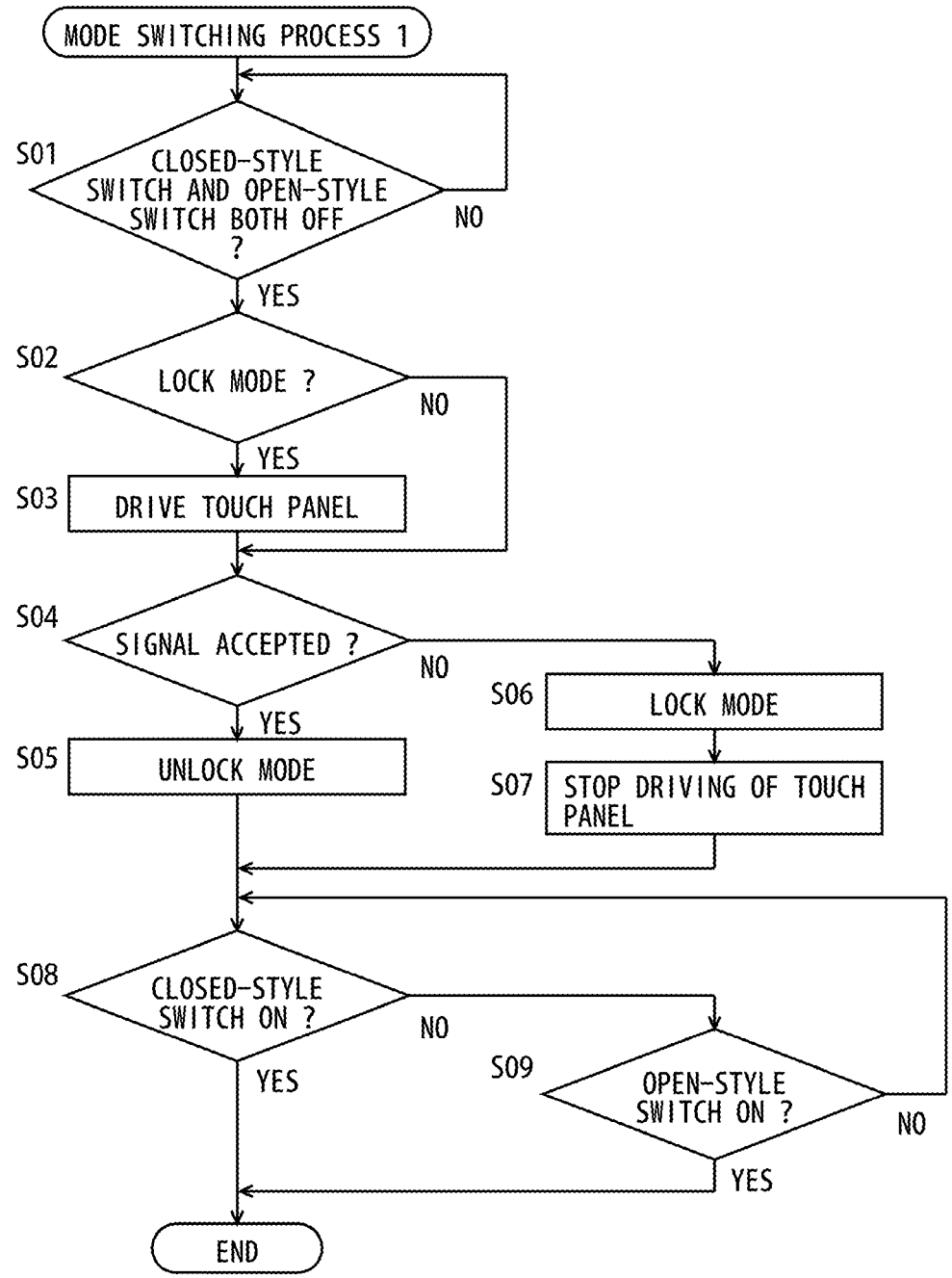
FIG. 6 is a flowchart illustrating an example of the flow of a mode switching process.

FIG. 6 is a flowchart illustrating an example of the flow of a mode switching process. The mode switching process is carried out by CPU 21 as CPU 21 executes a mode switching program. The mode switching process is carried out when mobile terminal 1 is in the primary style or in the open style. In other words, the process is carried out in the case where either one of closed-style switch 34 and closed-style switch 34 is ON.

Referring to FIG. 6, CPU 21 determines whether closed-style switch 34 and open-style switch 35 are both OFF (step S01). In other words, it determines whether mobile terminal 2 has been changed in style from the primary or open style to the intermediate style. The process waits until closed-style switch 34 and open-style switch 35 become both OFF (NO in step S01), and once closed-style switch 34 and open-style switch 35 become both OFF, the process proceeds to step S02.

In step S02, it is determined whether the input mode is set to the lock mode. If the input mode is set to the lock mode, the process proceeds to step S03; otherwise, the process proceeds to step S04.

In step S03, electric power is supplied to touch panel 25A so as to drive touch panel 25A. The process proceeds to step S03 when the input mode is the lock mode. In the lock mode, electric power supply to touch panel 25A is cut off to prohibit driving thereof, as will be described later in conjunction with step S07. In the state where driving of touch panel 25A is being prohibited, no signal will be output even when part of touch panel 25A is depressed from the outside. Thus, in step S03, touch panel 25A is driven to let it attain the state where it can output a signal when part of touch panel 25A is depressed from the outside. It is noted that in the case where touch panel 25A of a resistive film type is used and its driving does not have to be controlled, touch panel 25A may maintain the state where it can output a signal, in which case the processes in steps S02 and S03 are unnecessary.

In the following step S04, it is determined whether a signal has been accepted from touch panel 25A. If a signal has been accepted from touch panel 25A, the process proceeds to step S05; otherwise, the process proceeds to step S06. Touch panel 25A outputs a signal when its part is depressed. Therefore, the process proceeds to step S05 in the case where the user has changed the style of mobile terminal 1 from the primary or open style to the intermediate style while touching touch panel 25A. On the other hand, the process proceeds to step S07 in the case where the user has changed the style of mobile terminal 1 from the primary or open style to the intermediate style without touching touch panel 25A.

In step S05, the input mode is switched to the unlock mode, and the process proceeds to step S08. When the input mode is the unlock mode, the signal accepted from touch panel 25A is enabled, in which case the application program to be executed by CPU 21 is carried out in accordance with the signal accepted from touch panel 25A.

On the other hand, in step S06, the input mode is switched to the lock mode, and the process proceeds to step S07. This causes the signal accepted from touch panel 25A to be disabled. Thus, even in the case where an object externally touches touch panel 25A while the terminal is being carried or the like, the signal output from touch panel 25A is disabled, which can prevent malfunction of mobile terminal 1.

In the following step S07, electric power supply to touch panel 25A is cut off, to stop driving of touch panel 25A. During the time when the input mode is switched to the lock mode, the signal output from touch panel 25A is disabled. Therefore, driving of touch panel 25A can be stopped, whereby power consumption can be reduced.

In step S08, it is determined whether closed-style switch 34 is ON. If closed-style switch 34 is ON, the process is terminated; otherwise, the process proceeds to step S09. In step S09, it is determined whether open-style switch 35 is ON. If open-style switch 35 is ON, the process is terminated; otherwise, the process returns to step S09. That is, the process is terminated when mobile terminal 1 is changed in style from the intermediate style to the primary or open style.

Accordingly, in the state where mobile terminal 1 is in the primary or open style, when the style of mobile terminal 1 is changed to the intermediate style while touch panel 25A thereof is being touched, the input mode is switched to the unlock mode. Subsequently, when the style of mobile terminal 1 is changed to the primary or open style, the input mode that has been switched to the unlock mode is maintained. On the other hand, in the state where mobile terminal 1 is in the primary or open style, when the style of mobile terminal 1 is changed to the intermediate style while touch panel 25A thereof is not being touched, the input mode is switched to the lock mode. Subsequently, when the style of mobile terminal 1 is changed to the primary or open style, the input mode that has been switched to the lock mode is maintained. In this manner, the input mode of mobile terminal 1 in the primary or open style can be switched by a simple operation of temporarily changing the style of mobile terminal 1 to the intermediate style.

<Modification>

In mobile terminal 1 described above, the input mode is switched by an operation of changing the style of mobile terminal 1 from the primary or open style to the intermediate style while touching, or without touching, touch panel 25A. In mobile terminal 1 according to a modification, it is configured such that the input mode is switched by an operation of changing the style of mobile terminal 1 from the intermediate style to the primary or open style while touching, or without touching, touch panel 25A. Hereinafter, differences from the above-described mobile terminal will be described.

Figure 7:
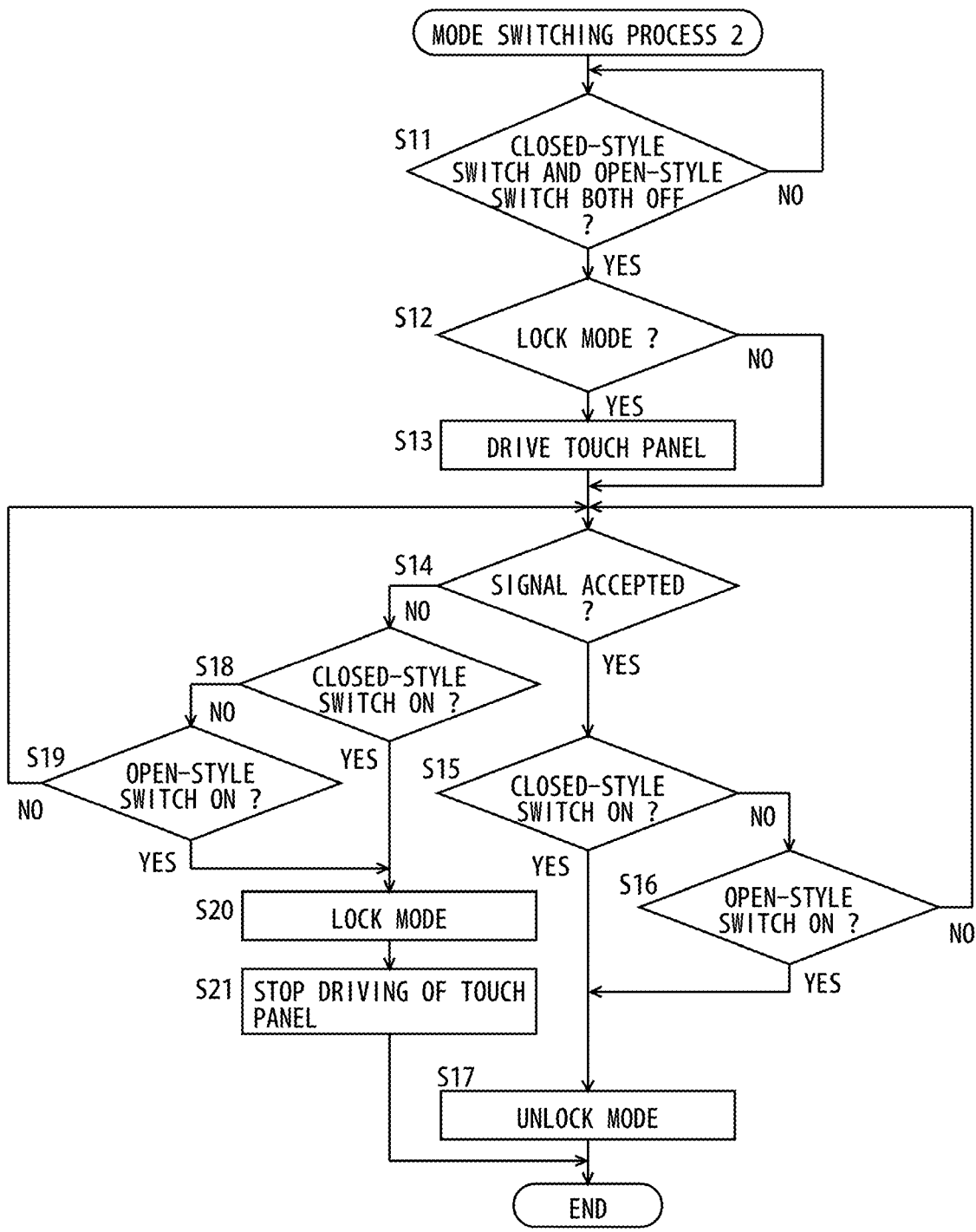
FIG. 7 is a flowchart illustrating an example of the flow of mode switching according to a modification.

FIG. 7 is a flowchart illustrating an example of the flow of mode switching according to the modification. The mode switching process in the modification is executed in the state where mobile terminal 1 is in the primary or open style. In other words, it is the process executed in the case where either one of closed-style switch 34 and closed-style switch 34 is ON.

Referring to FIG. 7, the processes in steps S11 to S13 are identical to those in steps S01 to S03, respectively, shown in FIG. 6. Thus, description thereof will not be repeated here.

In step S14, it is determined whether a signal has been accepted from touch panel 25A. If a signal has been accepted from touch panel 25A, the process proceeds to step S15; otherwise, the process proceeds to step S18.

In step S15, it is determined whether closed-style switch 34 is ON. If closed-style switch 34 is ON, the process proceeds to step S17; otherwise, the process proceeds to step S16. In step S16, it is determined whether open-style switch 35 is ON. If open-style switch 35 is ON, the process proceeds to step S17; otherwise, the process returns to step S14. That is, the process proceeds to step S17 when the style of mobile terminal 1 is changed from the intermediate style to the primary or open style.

In step S17, the input mode is switched to the unlock mode, and the process is terminated. The process proceeds to step S17 in the case where the user has changed the style of mobile terminal 1 from the intermediate style to the primary or open style while touching touch panel 25A. This means that the user can switch the input mode of mobile terminal 1 to the unlock mode by a simple operation of changing the style of mobile terminal 1 from the intermediate style to the primary or open style while touching touch panel 25A.

On the other hand, in step S18, it is determined whether closed-style switch 34 is ON. If closed-style switch 34 is ON, the process proceeds to step S20; otherwise, the process proceeds to step S19. In step S19, it is determined whether open-style switch 35 is ON. If open-style switch 35 is ON, the process proceeds to step S20; otherwise, the process returns to step S14. That is, the process proceeds to step S20 when the style of mobile terminal 1 is changed from the intermediate style to the primary or open style.

In step S20, the input mode is switched to the lock mode, and the process proceeds to step S21. This causes the signal accepted from touch panel 25A to be disabled. Accordingly, even in the case where an object externally touches touch panel 25A while the terminal is being carried or the like, the signal output from touch panel 25A is disabled, whereby malfunction of mobile terminal 1 can be prevented.

The process proceeds to step S20 in the case where the user has changed the style of mobile terminal 1 from the intermediate style to the primary or open style without touching touch panel 25A. This means that the user can switch the input mode of mobile terminal 1 to the lock mode by a simple operation of changing the style of mobile terminal 1 from the intermediate style to the primary or open style without touching touch panel 25A.

In step S21, electric power supply to touch panel 25A is cut off to stop driving of touch panel 25A, and the process is terminated. During the time when the input mode is switched to the lock mode, the signal output from touch panel 25A is disabled. Thus, driving of touch panel 25A can be stopped, whereby power consumption can be reduced.

As described above, mobile terminal 1 according to the present embodiment is configured to switch the input mode between the lock mode and the unlock mode on the basis of the style of mobile terminal 1 and presence/absence of a signal output from touch panel 25A. A user is able to switch the input mode by performing either an operation of changing the style of mobile terminal 1 by sliding first housing 40 with respect to second housing 41 while touching the touch panel or an operation of changing the style of mobile terminal 1 by sliding first housing 40 with respect to second housing 41 without touching the touch panel.

In the state where mobile terminal 1 is in the primary or open style, the input mode can be switched to the unlock mode by performing an operation of changing the style of mobile terminal 1 to the intermediate style by sliding first housing 40 with respect to second housing 41 while touching touch panel 25A with the finger. Further, in the state where mobile terminal 1 is in the primary or open style, the input mode can be switched to the lock mode by performing an operation of changing the style of mobile terminal 1 to the intermediate style by sliding first housing 40 with respect to second housing 41 without touching the touch panel.

In the case of the modification, in the state where mobile terminal 1 is in the intermediate style, the input mode can be switched to the unlock mode by performing an operation of changing the style of mobile terminal 1 to the primary or open style by sliding first housing 40 with respect to second housing 41 while touching touch panel 25A with the finger. Further, in the modification, in the state where mobile terminal 1 is in the intermediate style, the input mode can be switched to the lock mode by performing an operation of changing the style of mobile terminal 1 to the primary or open style by sliding first housing 40 with respect to second housing 41 without touching the touch panel.

Furthermore, in the state where mobile terminal 1 is in the primary or open style, when the style of mobile terminal 1 is changed to the intermediate style by sliding first housing 40 with respect to second housing 41, the touch panel is driven. When the input mode is switched to the lock mode, driving of the touch panel is prohibited. Thus, even in the case where touch panel 25A of a capacitive type is used, the input mode can be switched while the consumed power is reduced.

It has been configured such that, when the touch panel is not touched in the intermediated style, the mobile terminal attains the locked state in the primary or open style. Alternatively, it may be configured such that, when the mobile terminal is opened or closed without touching the touch panel, the mode before being opened or closed is maintained, whether it is the lock mode or the unlock mode. In this case, even when the mobile terminal is opened or closed, the mode will not be changed if the touch panel is not touched. This allows the user to release the lock by opening or closing the terminal while touching the touch panel only in the case where the user wishes to use the touch panel. In the case where the user does not wish to use the touch panel, the user may maintain the locked state by opening or closing the terminal without touching the touch panel. As a result, it is possible to provide a user-friendly user interface which can well reflect the user's intention to operate the touch panel.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A mobile terminal comprising:
   a first housing comprising a touch panel;
   a second housing, wherein the first housing and the second housing are connected to each in a slidable manner and capable of being positioned in a plurality of positions relative to each other, including a closed position in which a surface of the second housing is covered by the first housing and an open position in which the surface of the second housing is exposed; at least one central processing unit; and
   one or more executable modules that are configured to, when executed by the at least one central processing unit, of said first housing relative to said second housing, switch between an unlocked input mode in which signal output from said touch panel is accepted and a locked input mode in which signal output from said touch panel is not accepted, during a transition between a start position, comprising either the closed position or the open position, and an end position, comprising the other one of the closed position and the open position, operate in said locked input mode,
   when a signal output from said touch panel is accepted during at least a portion of the transition, switch to the unlocked input mode after the transition to the end position, and,
   when a signal output is not accepted during the at least a portion of the transition, maintain the locked input mode after the transition to the end position.

2. The mobile terminal according to claim 1, wherein the plurality of positions further include an intermediate position between said closed position and said open position.

3. The mobile terminal according to claim 2, wherein said at least a portion of the transition comprises a time after a change from said start position to said intermediate position.

4. The mobile terminal according to claim 2, wherein said at least a portion of the transition comprises a time before a change from said intermediate position to said end position.

5. The mobile terminal according to claim 1, wherein the one or more executable modules are further configured to drive said touch panel in said unlocked input mode and not drive said touch panel in said locked input mode.

6. A mobile terminal comprising:
   a first housing comprising a touch panel;
   a second housing, wherein the first housing and the second housing are connected to each other in a slidable manner and capable of being positioned in a plurality of positions relative to each other, including a closed position in which a surface of the second housing is covered by the first housing and an open position in which the surface of the second housing is exposed; at least one central processing unit; and
   one or more executable modules that are configured to, when executed by the at least one central processing unit, detect a position of said first housing relative to said second housing; switch between an unlocked input mode in which a signal output from said touch panel is accepted and a locked input mode in which signal output from said touch panel is not accepted, subsequent to operation in an initial one of the unlocked input mode and the locked input mode, during a transition between a start position, comprising either the closed position or the open position, and an end position, comprising the other one of the closed position and the open position, operate in said locked input mode,
   when a signal output from said touch panel is accepted during at least a portion of the transition, switch to the unlocked input mode after the transition to the end position, and,
   when a signal output from said touch panel is not accepted during the at least a portion of the transition, operate in the initial input mode after the transition to the end position.

7. The mobile terminal according to claim 6, wherein the plurality of positions further include an intermediate position between said closed position and said open position.

8. The mobile terminal according to claim 7, wherein said at least a portion of the transition comprises a time after a change from said start position to said end position.

9. The mobile terminal according to claim 7, wherein said at least a portion of the transition comprises a time before a change from said intermediate position to said end position.

10. The mobile terminal according to claim 7, wherein the one or more executable modules are further configured to drive said touch panel in said unlocked input mode and not drive said touch panel in said locked input mode.

* * * * *

UNITED STATES PATENT AND TRADEMARK OFFICE
CERTIFICATE OF CORRECTION

PATENT NO. : 8,818,468 B2  
APPLICATION NO. : 12/810475  
DATED : August 26, 2014  
INVENTOR(S) : Naoki Matsuo Page 1 of 1

It is certified that error appears in the above-identified patent and that said Letters Patent is hereby corrected as shown below:

In the claims

In Claim 1, column 9, line 22, after "unit," and before "of said first housing relative to said second housing,", please insert -- detect a position --

Signed and Sealed this
Twenty-third Day of February, 2016

Michelle K. Lee
*Director of the United States Patent and Trademark Office*